US012634808B2

(12) United States Patent
Zhang et al.

(10) Patent No.: US 12,634,808 B2
(45) Date of Patent: May 19, 2026

(54) COMMUNICATION METHOD AND APPARATUS

(71) Applicant: HUAWEI TECHNOLOGIES CO., LTD., Shenzhen (CN)

(72) Inventors: Yunhao Zhang, Shanghai (CN); Xiuqiang Xu, Shanghai (CN); Yiqun Wu, Shanghai (CN); Yan Chen, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 574 days.

(21) Appl. No.: 17/994,047

(22) Filed: Nov. 25, 2022

(65) Prior Publication Data

US 2023/0088910 A1 Mar. 23, 2023

Related U.S. Application Data

(63) Continuation of application No. PCT/CN2021/096677, filed on May 28, 2021.

(30) Foreign Application Priority Data

May 28, 2020 (CN) .......................... 202010470175.4

(51) Int. Cl.
*H04W 16/00* (2009.01)
*H04B 17/318* (2015.01)
(Continued)

(52) U.S. Cl.
CPC .......... *H04W 48/16* (2013.01); *H04B 17/328* (2023.05); *H04L 25/0224* (2013.01); *H04W 24/10* (2013.01); *H04W 56/001* (2013.01)

(58) Field of Classification Search
CPC .. H04B 17/318; H04L 25/0224; H04W 24/02; H04W 24/04; H04W 24/08; H04W 24/10; H04W 48/16; H04W 56/001
See application file for complete search history.

(56) References Cited

U.S. PATENT DOCUMENTS 11,792,656 B2 * 10/2023 Ramiro Moreno ... H04W 16/22
370/338
2021/0227442 A1 * 7/2021 Yiu .................. H04W 36/00837
(Continued)

FOREIGN PATENT DOCUMENTS

CN 107027095 A 8/2017
CN 107734590 A 2/2018
(Continued)

OTHER PUBLICATIONS

India Office Action issued in corresponding India Application No. 202217071225, dated Feb. 1, 2024, pp. 1-8.
(Continued)

*Primary Examiner* — Phuc H Tran
(74) *Attorney, Agent, or Firm* — HAUPTMAN HAM, LLP

(57) ABSTRACT

A communication method includes receiving indication information that is of a target reference signal and that is sent by a cluster head terminal. The communication method also includes measuring the target reference signal based on the indication information, to obtain a coverage level of a cluster member terminal in a target cell.

20 Claims, 8 Drawing Sheets

(51) Int. Cl.

| | | |
|---|---|---|
| *H04L 25/02* | (2006.01) | |
| *H04W 24/10* | (2009.01) | |
| *H04W 48/16* | (2009.01) | |
| *H04W 56/00* | (2009.01) | |

(56) References Cited

U.S. PATENT DOCUMENTS

| | | | | |
|---|---|---|---|---|
| 2021/0321306 A1* | 10/2021 | Bin Redhwan ... | H04W 36/0058 |
| 2021/0377916 A1* | 12/2021 | Shi ........................ | H04W 24/02 |

FOREIGN PATENT DOCUMENTS

| | | | | | |
|---|---|---|---|---|---|
| CN | 108934023 | A | 12/2018 | | |
| CN | 109246791 | A | 1/2019 | | |
| CN | 104519514 | B | 12/2019 | | |
| EP | 3520458 | A1 | 8/2019 | | |
| EP | 3855811 | A1 | 7/2021 | | |
| WO | 2016190711 | A1 | 12/2016 | | |
| WO | 2018031300 | A1 | 2/2018 | | |
| WO | WO-2020067682 | A1 * | 4/2020 | ........... | H04B 17/318 |
| WO | 2021056147 | A1 | 4/2021 | | |

OTHER PUBLICATIONS

International Search Report issued in corresponding International Application No. PCT/CN2021/096677, dated Jul. 28, 2021, pp. 1-11.

Partial Supplementary European Search Report issued in corresponding European Application No. 21814149.7, dated Oct. 24, 2023, pp. 1-14.

* cited by examiner

S301: Send a preamble and data to the network device

S302: Send a random access response to the terminal device

403

401

402

402

402

402

401

402

402

Partial-coverage terminal cluster

402

402

In-coverage terminal cluster

401

402

402

402

Out-of-coverage terminal cluster

COMMUNICATION METHOD AND APPARATUS

CROSS-REFERENCE TO RELATED APPLICATIONS

This application is a continuation of International Application No. PCT/CN2021/096677, filed on May 28, 2021, which claims priority to Chinese Patent Application No. 202010470175.4, filed on May 28, 2020. The disclosures of the aforementioned applications are hereby incorporated by reference in their entireties.

TECHNICAL FIELD

Embodiments of this application relate to the field of information technologies, and in particular, to a communication method and apparatus.

BACKGROUND

Standards such as long term evolution (long term evolution, LTE) and new radio (new radio, NR) of the 3rd generation partnership project (3rd generation partnership project, 3GPP) support device-to-device (D2D) direct communication through a sidelink (sidelink). In some scenarios, for example, during massive machine-type communications (massive machine-type communications, mMTC) massive connectivity, quality of channels between some terminal devices and a network device is poor. In this case, a plurality of terminal devices require clustering communication, and a nearby terminal device is required to assist in forwarding data. Clustering communication usually includes a cluster head terminal and a cluster member terminal. The cluster head terminal is the most important terminal device in a cluster and has a capability of directly communicating with a network. The cluster member terminal is a terminal other than the cluster head terminal in the cluster.

In an existing clustering communication solution, after mastering information about cluster member terminals, a cluster head terminal may randomly access a network device. Subsequently, the cluster head terminal may send an identity document (identity document, ID) of the cluster head terminal and IDs of the cluster member terminals to the network device, and the network device allocates a radio network temporary identifier (radio network temporary identifier, RNTI) to each terminal and performs radio resource control (radio resource control, RRC) configuration on the terminal based on the ID of the cluster head terminal and the IDs of the cluster member terminals.

However, an existing cluster member terminal usually cannot determine a coverage level of a cell in which the cluster head terminal is located. As a result, the network device cannot perform different RRC configuration based on different coverage levels.

SUMMARY

Embodiments of this application provide a communication method and apparatus, to resolve a technical problem in a conventional technology that a cluster member terminal cannot determine a coverage level of a cell in which a cluster head terminal is located.

According to a first aspect, an embodiment of this application provides a communication method. The method may be applied to a communication apparatus, or may be applied to a chip in the communication apparatus. The communication apparatus may be a cluster member terminal. The following describes the method by using an example in which the method is applied to a cluster member terminal. In the method, the cluster member terminal receives indication information that is of a target reference signal and that is sent by a cluster head terminal, and then measures the target reference signal based on the indication information, to obtain a coverage level of the cluster member terminal in a target cell.

According to the communication method provided in the first aspect, the cluster member terminal measures the target reference signal based on the indication information, to learn of the coverage level of the cell in which the cluster head terminal is located.

In an implementation, after the obtaining a coverage level of the cluster member terminal in a target cell, the method further includes: sending the coverage level of the cluster member terminal in the target cell to the cluster head terminal.

According to the communication method provided in this implementation, the cluster head terminal may learn of the coverage level of the cluster member terminal, and further send the coverage level of the cluster member terminal to a network device, so that different RRC configurations may be allocated to the cluster member terminal based on different coverage levels.

In an implementation, the indication information of the target reference signal includes an identifier of the target reference signal, a time-frequency position of the target reference signal, and/or a synchronization sequence pattern of the target reference signal.

In an implementation, the measuring the target reference signal based on the indication information, to obtain a coverage level of the cluster member terminal in a target cell includes: determining the target reference signal based on the indication information of the target reference signal; measuring the target reference signal to obtain a reference signal received power RSRP corresponding to the target reference signal; and obtaining the coverage level of the cluster member terminal in the target cell based on the RSRP corresponding to the target reference signal and one or more RSRP thresholds.

According to the communication method provided in this implementation, the coverage level of the cluster member terminal in the target cell can be more accurately determined by comparing the RSRP corresponding to the target reference signal with the one or more RSRP thresholds.

In an implementation, before the obtaining the coverage level of the cluster member terminal in the target cell based on the RSRP corresponding to the target reference signal and one or more RSRP thresholds, the method further includes: receiving the one or more RSRP thresholds sent by the cluster head terminal.

In an implementation, after the sending the coverage level of the cluster member terminal in the target cell to the cluster head terminal, the method further includes: sending, to the cluster head terminal, an identifier of a cell on which the cluster member terminal camps and/or a connection status of the cluster member terminal in the cell on which the cluster member terminal camps.

In an implementation, after the sending the coverage level of the cluster member terminal in the target cell to the cluster head terminal, the method further includes: receiving a radio resource control RRC configuration that is of the cluster member terminal and that is sent by the cluster head terminal.

In an implementation, the target reference signal includes a synchronization signal block SSB and/or a channel state information-reference signal CSI-RS.

According to a second aspect, an embodiment of this application provides a communication method. The method may be applied to a communication apparatus, or may be applied to a chip in the communication apparatus. The communication apparatus may be a cluster head terminal. The following describes the method by using an example in which the method is applied to a cluster head terminal. In the method, the cluster head terminal first sends indication information of a target reference signal to a cluster member terminal, and then the cluster head terminal receives a coverage level that is of the cluster member terminal in a target cell and that is sent by the cluster member terminal.

In an implementation, after the receiving a coverage level that is of the cluster member terminal in a target cell and that is sent by the cluster member terminal, the method further includes:

sending the coverage level of the cluster member terminal in the target cell to a network device.

In an implementation, the indication information of the target reference signal includes an identifier of the target reference signal, a time-frequency position of the target reference signal, and/or a synchronization sequence pattern of the target reference signal.

In an implementation, before the receiving a coverage level that is of the cluster member terminal in a target cell and that is sent by the cluster member terminal, the method further includes:

receiving an RSRP threshold sent by a network device; and sending the RSRP threshold to the cluster member terminal.

In an implementation, before the sending indication information of a target reference signal to a cluster member terminal, the method further includes:

determining the target reference signal from a plurality of reference signals.

In an implementation, before the sending indication information of a target reference signal to a cluster member terminal, the method further includes:

receiving first information sent by the network device, where the first information indicates the target reference signal from the plurality of reference signals.

In an implementation, the sending the coverage level of the cluster member terminal in the target cell to a network device includes:

sending the coverage level of the cluster member terminal in the target cell to the network device by using a random access request initiated by a cluster head terminal.

In an implementation, after the receiving a coverage level that is of the cluster member terminal in a target cell and that is sent by the cluster member terminal, the method further includes:

receiving, from the cluster member terminal, an identifier of a cell on which the cluster member terminal camps and/or a connection status of the cluster member terminal in the cell on which the cluster member terminal camps.

In an implementation, the target reference signal includes a synchronization signal block SSB and/or a channel state information-reference signal CSI-RS.

According to a third aspect, an embodiment of this application provides a communication method. The method may be applied to a communication apparatus, or may be applied to a chip in the communication apparatus. The communication apparatus may be a network device. The following describes the method by using an example in which the method is applied to a network device. In the method, the network device first receives a coverage level that is of a cluster member terminal in a target cell and that is sent by a cluster head terminal; and then the network device determines a radio resource control RRC configuration of the cluster member terminal based on the coverage level of the cluster member terminal in the target cell.

According to a fourth aspect, an embodiment of this application provides a communication apparatus. The communication apparatus includes:

a receiving module, configured to receive indication information that is of a target reference signal and that is sent by a cluster head terminal; and a processing module, configured to measure the target reference signal based on the indication information, to obtain a coverage level of a cluster member terminal in a target cell.

In an implementation, the apparatus further includes:

a sending module, configured to send the coverage level of the cluster member terminal in the target cell to the cluster head terminal.

In an implementation, the indication information of the target reference signal includes an identifier of the target reference signal, a time-frequency position of the target reference signal, and/or a synchronization sequence pattern of the target reference signal.

In an implementation, the processing module is specifically configured to: determine the target reference signal based on the indication information of the target reference signal; measure the target reference signal to obtain a reference signal received power RSRP corresponding to the target reference signal; and obtain the coverage level of the cluster member terminal in the target cell based on the RSRP corresponding to the target reference signal and one or more RSRP thresholds.

In an implementation, the receiving module is further configured to receive the one or more RSRP thresholds sent by the cluster head terminal.

In an implementation, the sending module is further configured to send, to the cluster head terminal, an identifier of a cell on which the cluster member terminal camps and/or a connection status of the cluster member terminal in the cell on which the cluster member terminal camps.

In an implementation, the receiving module is further configured to receive a radio resource control RRC configuration that is of the cluster member terminal and that is sent by the cluster head terminal.

In an implementation, the target reference signal includes a synchronization signal block SSB and/or a channel state information-reference signal CSI-RS.

According to a fifth aspect, an embodiment of this application provides a communication apparatus. The communication apparatus includes:

a sending module, configured to send indication information of a target reference signal to a cluster member terminal; and a receiving module, configured to receive a coverage level that is of the cluster member terminal in a target cell and that is sent by the cluster member terminal.

In an implementation, the sending module is further configured to send the coverage level of the cluster member terminal in the target cell to a network device.

In an implementation, the indication information of the target reference signal includes an identifier of the target reference signal, a time-frequency position of the target reference signal, and/or a synchronization sequence pattern of the target reference signal.

In an implementation, the receiving module is further configured to receive an RSRP threshold sent by a network device; and the sending module is further configured to send the RSRP threshold to the cluster member terminal.

In an implementation, the apparatus further includes:

a processing module, configured to determine the target reference signal from a plurality of reference signals.

In a possible implementation, the receiving module is further configured to receive first information sent by the network device, where the first information indicates the target reference signal from the plurality of reference signals.

In an implementation, the sending module is specifically configured to send the coverage level of the cluster member terminal in the target cell to the network device by using a random access request initiated by a cluster head terminal.

In an implementation, the receiving module is further configured to receive, from the cluster member terminal, an identifier of a cell on which the cluster member terminal camps and/or a connection status of the cluster member terminal in the cell on which the cluster member terminal camps.

In an implementation, the target reference signal includes a synchronization signal block SSB and/or a channel state information-reference signal CSI-RS.

According to a sixth aspect, an embodiment of this application provides a communication apparatus. The communication apparatus includes:

a receiving module, configured to receive a coverage level that is of a cluster member terminal in a target cell and that is sent by a cluster head terminal; and a processing module, configured to determine a radio resource control RRC configuration of the cluster member terminal based on the coverage level of the cluster member terminal in the target cell.

According to a seventh aspect, an embodiment of this application provides a communication system, including a cluster head terminal, a cluster member terminal, and a network device, where the cluster head terminal separately communicates with the cluster member terminal and the network device; and the cluster member terminal is configured to perform the method according to the first aspect, the cluster head terminal is configured to perform the method according to the second method, and the network device is configured to perform the method according to the third method.

According to an eighth aspect, an embodiment of this application provides a cluster member terminal. The cluster member terminal includes a processor, a memory, a transmitter, and a receiver. The transmitter and the receiver are coupled to the processor, the processor controls a sending action of the transmitter, and the processor controls a receiving action of the receiver.

The memory is configured to store computer-executable program code, where the program code includes information. When the processor executes the information, the information enables the cluster member terminal to perform the communication method provided in the first aspect.

According to a ninth aspect, an embodiment of this application provides a cluster head terminal. The cluster head terminal includes a processor, a memory, a transmitter, and a receiver. The transmitter and the receiver are coupled to the processor, the processor controls a sending action of the transmitter, and the processor controls a receiving action of the receiver.

The memory is configured to store computer-executable program code, where the program code includes information. When the processor executes the information, the information enables the cluster head terminal to perform the communication method provided in the second aspect.

According to a tenth aspect, an embodiment of this application provides a network device. The network device includes a processor, a memory, a transmitter, and a receiver. The transmitter and the receiver are coupled to the processor, the processor controls a sending action of the transmitter, and the processor controls a receiving action of the receiver.

The memory is configured to store computer-executable program code, where the program code includes information. When the processor executes the information, the information enables the network device to perform the communication method provided in the third aspect.

According to an eleventh aspect, an embodiment of this application provides a chip, including a processor, configured to invoke a computer program from a memory and run the computer program, to enable a device in which the chip is installed to perform the communication method provided in the first aspect.

According to a twelfth aspect, an embodiment of this application provides a chip, including a processor, configured to invoke a computer program from a memory and run the computer program, to enable a device in which the chip is installed to perform the communication method provided in the second aspect.

According to a thirteenth aspect, an embodiment of this application provides a chip, including a processor, configured to invoke a computer program from a memory and run the computer program, to enable a device in which the chip is installed to perform the communication method provided in the third aspect.

According to a fourteenth aspect, an embodiment of this application provides a computer-readable storage medium, configured to store a computer program. The computer program enables a computer to perform the communication method provided in the first aspect.

According to a fifteenth aspect, an embodiment of this application provides a computer-readable storage medium, configured to store a computer program. The computer program enables a computer to perform the communication method provided in the second aspect.

According to a sixteenth aspect, an embodiment of this application provides a computer-readable storage medium, configured to store a computer program. The computer program enables a computer to perform the communication method provided in the third aspect.

According to a seventeenth aspect, an embodiment of this application provides a computer program product, including computer program information. The computer program information enables a computer to perform the communication method provided in the first aspect.

According to an eighteenth aspect, an embodiment of this application provides a computer program product, including computer program information. The computer program information enables a computer to perform the communication method provided in the second aspect.

According to a nineteenth aspect, an embodiment of this application provides a computer program product, including computer program information. The computer program information enables a computer to perform the communication method provided in the third aspect.

According to a twentieth aspect, an embodiment of this application provides a computer program. The computer program enables a computer to perform the communication method provided in the first aspect.

According to a twenty-first aspect, an embodiment of this application provides a computer program. The computer program enables a computer to perform the communication method provided in the second aspect.

According to a twenty-second aspect, an embodiment of this application provides a computer program. The computer program enables a computer to perform the communication method provided in the third aspect.

According to the communication method and apparatus provided in this application, a cluster member terminal receives indication information that is of a target reference signal and that is sent by a cluster head terminal, and then the cluster member terminal measures the target reference signal based on the indication information, to obtain a coverage level of the cluster member terminal in a target cell. In comparison with a conventional technology, in embodiments of this application, the cluster head terminal indicates, by sending the indication information of the target reference signal to the cluster member terminal, the cluster member terminal to measure the target reference signal, so that the cluster head terminal learns of the coverage level of the cluster member terminal in the target cell, and further, a network device can perform different RRC configuration based on different coverage levels of the cluster member terminal.

DESCRIPTION OF EMBODIMENTS

To make the objectives, technical solutions, and advantages of embodiments of the present invention clearer, the following clearly and completely describes the technical solutions in embodiments of the present invention with reference to the accompanying drawings in embodiments of the present invention. It is clear that the described embodiments are a part rather than all of embodiments of the present invention. All other embodiments obtained by a person of ordinary skill in the art based on embodiments of the present invention without creative efforts shall fall within the protection scope of the present invention.

First, a process, defined in the existing 3rd generation partnership project (3rd generation partnership project, 3GPP) protocol, in which a terminal device initially accesses a network is described.

Figure 1:
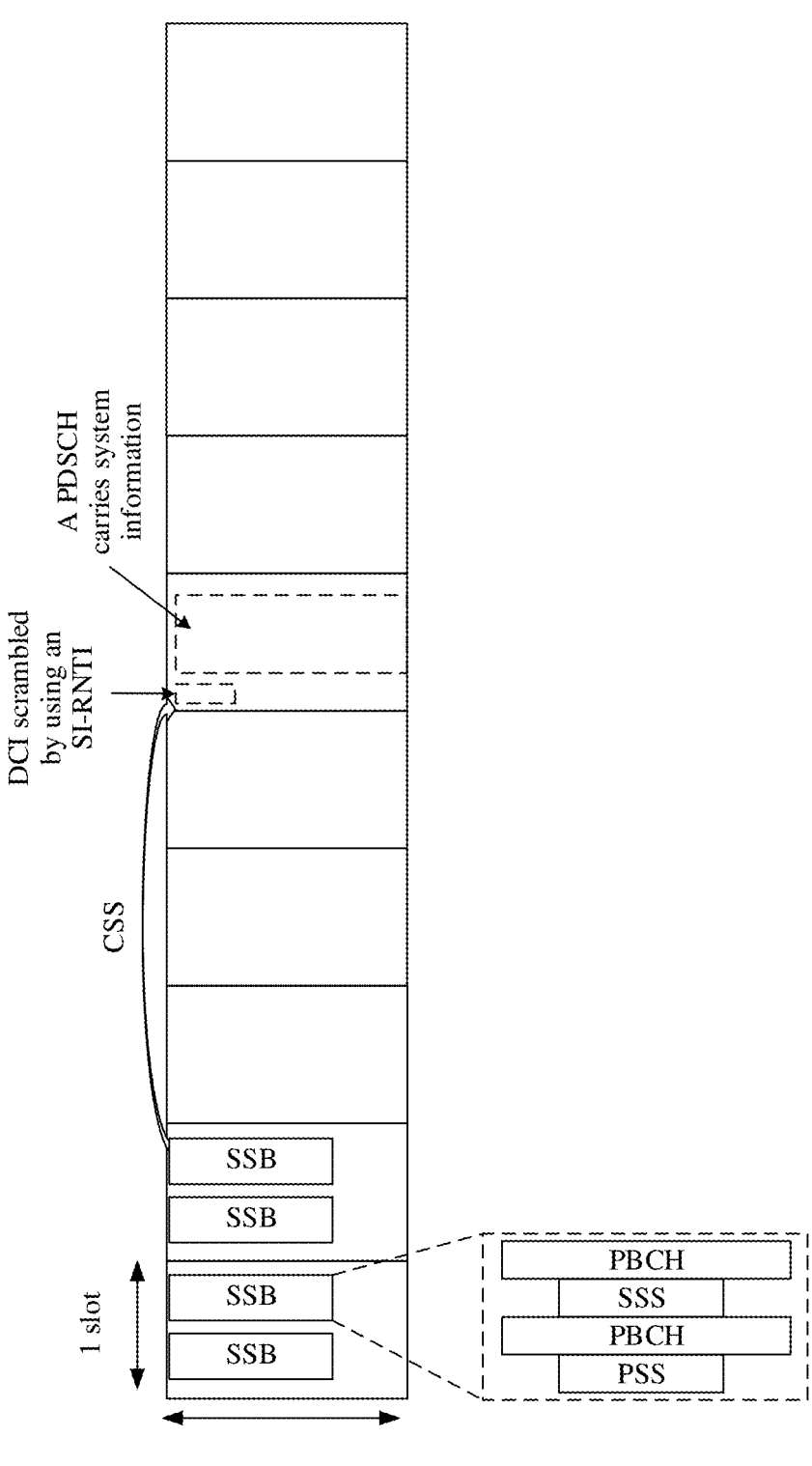
FIG. 1 is a schematic diagram of an existing principle of initial access of a terminal device.
Figure 2:
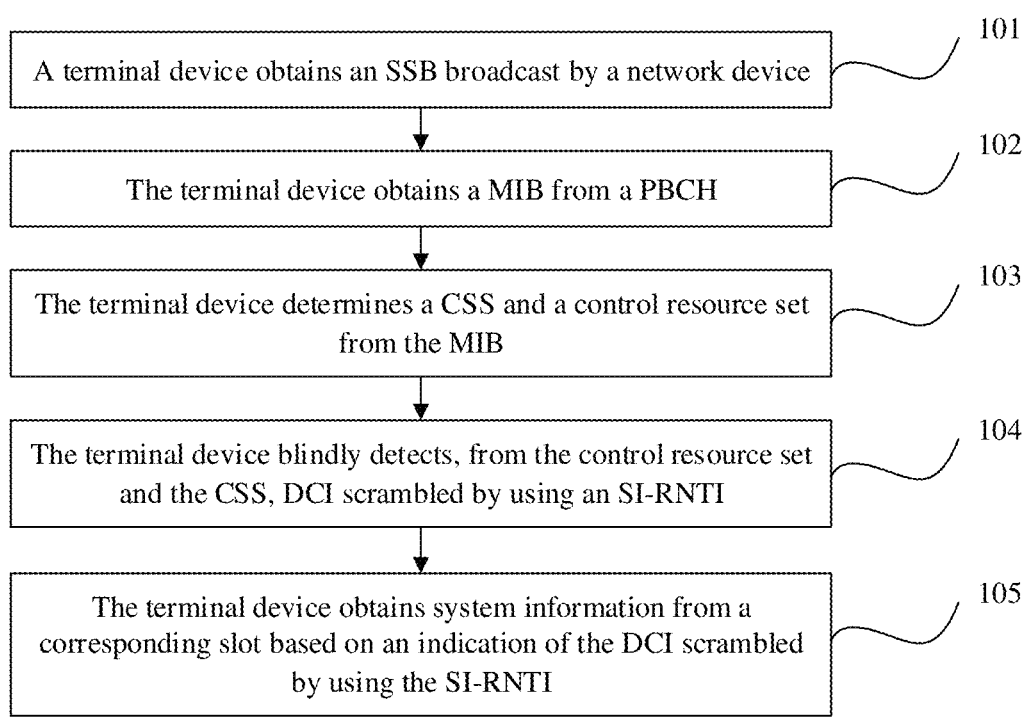
FIG. 2 is a schematic diagram of a procedure of initial access of a terminal device.

FIG. 1 is a schematic diagram of an existing principle of initial access of a terminal device, and FIG. 2 is a schematic diagram of an existing procedure of initial access of a terminal device. As shown in FIG. 1 and FIG. 2, a main purpose of performing initial access by a terminal device is to obtain downlink synchronization with a network device, and obtain system information of a cell in which the terminal device is located, to enable the terminal device to camp on the cell. The system information includes a master information block (master information block, MIB) and a system information block (system information block, SIB) 1.

As shown in FIG. 1, an initial access procedure of a terminal device mainly includes the following steps.

S101: The terminal device obtains a synchronization signal block (synchronization signal block) SSB broadcast by a network device.

The SSB includes a primary synchronization signal (primary synchronization signal, PSS), a secondary synchronization signal (secondary synchronization signal, SSS), and a physical broadcast channel (physical broadcast channel, PBCH). The PSS and the SSS are used to determine a cell identifier (Cell ID).

For example, the PSS and the SSS are two sequences, the PSS has three candidate patterns (Patterns), and the SSS has 336 candidate patterns. The terminal device may obtain a PSS pattern through sequence detection, and determine a second parameter where $$N_{ID}^{(2)},$$

where $$N_{ID}^{(2)}$$

$\in \{0, 1, 2\}$. In addition, the terminal device obtains an SSS pattern through sequence detection, and determines a first parameter $$N_{ID}^{(1)},$$

where $$N_{ID}^{(1)}$$

∈{0, 1, . . . , 335}. Finally, the terminal device may obtain the cell ID through calculation by using a formula Cell ID=336*$N_{ID}^2$+$N_{ID}^1$.

S102: The terminal device obtains a master system information block MIB from the PBCH.

S103: The terminal device determines a common search space (common search space, CSS) and a control resource set from the MIB.

S104: The terminal device blindly detects, from the control resource set and the CSS, downlink control information (downlink control information, DCI) scrambled by using a system information radio network temporary identifier (system information radio network temporary identifier, SI-RNTI).

S105: The terminal device obtains system information from a corresponding slot (slot) based on an indication of the DCI scrambled by using the SI-RNTI.

For example, the terminal device may obtain a SIB 1. The terminal device may obtain configuration information of an initial bandwidth part (bandwidth part, BWP), configuration information of a random access resource, configuration information of a paging resource, and the like from the SIB 1.

Based on FIG. 1 and FIG. 2, the following describes two common random access processes.

Figure 3:
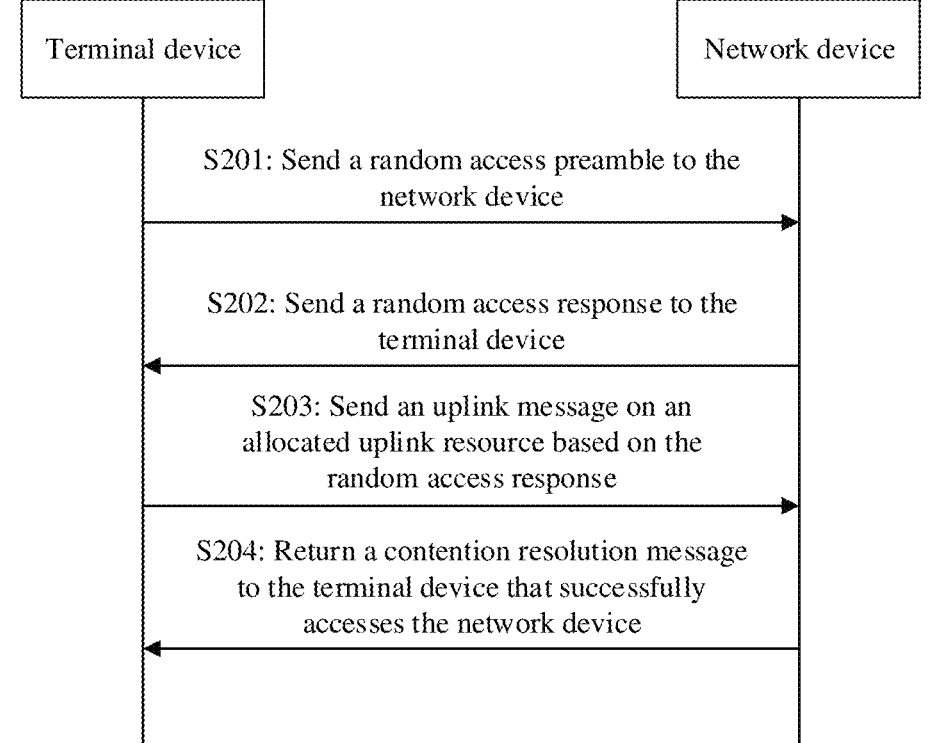
FIG. 3 is a signaling exchange diagram of existing four-step random access.

FIG. 3 is a signaling exchange diagram of existing four-step random access. As shown in FIG. 3, random access of a terminal device may include four steps, and the four-step random access includes the following steps.

S201: The terminal sends a random access preamble (Preamble) to a network device.

The preamble is also referred to as a first message (Msg1). The terminal device calculates an RA-RNTI based on a sequence number (Preamble Index) and a sending occasion of the preamble. The preamble is a sequence, and a function of the preamble is to notify the network device that there is a random access request, so that the network device can estimate a transmission delay between the terminal device and the network device, so that the network device calibrates uplink timing (uplink timing), and notifies the terminal device of calibration information by using a timing advance (timing advance, TA) instruction.

S202: The network device sends a random access response to the terminal device.

For example, after detecting the preamble, the network device calculates an RA-RNTI that is the same as that of the terminal device. Then, the network device sends the random access response to the terminal device. The random access response is also referred to as a second message (Msg2). Control information of the random access response is scrambled by using the RA-RNTI, and content of a data channel includes the sequence number (Preamble Index) of the preamble, a timing advance (timing advance, TA), uplink resource allocation information, a temporary cell radio network temporary identifier (cell radio network temporary identifier, C-RNTI), and the like.

S203: The terminal device sends an uplink message on an allocated uplink resource based on the random access response.

For example, if a random access preamble indicated by the preamble index in the random access response is the same as the preamble sent by the terminal device, the terminal device considers that the random access response is a random access response for the terminal device. After receiving the random access response, the terminal device may send the uplink message on the allocated uplink resource as indicated by the random access response. For example, the uplink message may be a physical uplink shared channel (physical uplink shared channel, PUSCH) sent by using an Msg3. The uplink message is also referred to as the third message (Msg3). The terminal device may initiate an RRC connection request by using the Msg3.

S204: The network device returns a contention resolution message to the terminal device that successfully accesses the network device.

The contention resolution message is also referred to as a fourth message (Msg4). Control information of the contention resolution message is scrambled by using a temporary C-RNTI. The network device includes, in the contention resolution message, a unique identifier in the Msg3, to specify the terminal device that successfully accesses the network device. However, another terminal device that fails to access the network device re-initiates random access. The network device may perform RRC configuration on the terminal device by using the Msg4.

Figure 4:
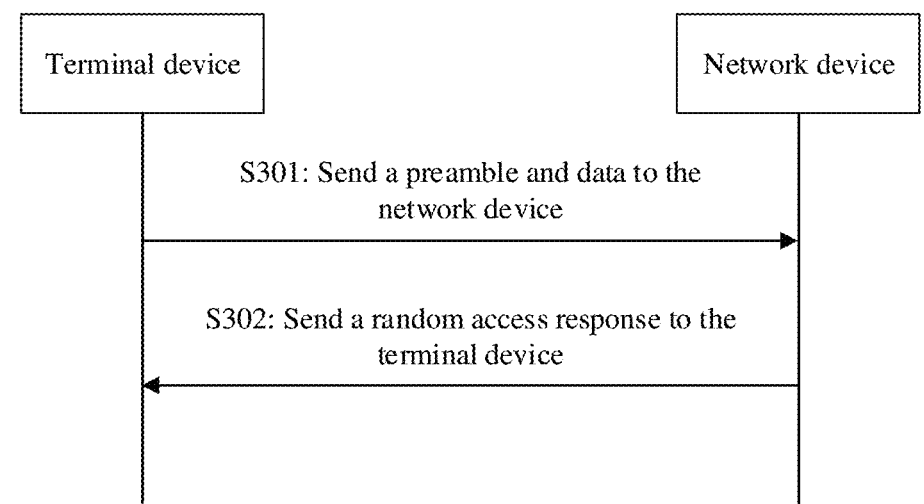
FIG. 4 is a signaling exchange diagram of existing two-step random access.

FIG. 4 is a signaling exchange diagram of existing two-step random access. As shown in FIG. 4, random access of a terminal device may include two steps, and the two-step random access includes the following steps.

S301: The terminal device sends a preamble and data to a network device.

The data may include an ID of the terminal device, and the message is also referred to as a MsgA. The terminal may calculate an RA-RNTI based on a preamble index and a sending occasion. The MsgA may carry an RRC configuration request.

S302: The network device sends a random access response to the terminal device.

The random access response is also referred to as a MsgB. The network device calculates an RA-RNTI that is the same as that of the terminal device, and scrambles control information, for example, DCI, of the random access response by using the RA-RNTI. The random access response includes a unique identifier of the terminal device, to specify the terminal device that successfully accesses the network device. However, another terminal device that fails to access the network device re-initiates random access. The random access response further includes a C-RNTI allocated to the terminal device. The network device may perform RRC configuration on the terminal by using the MsgB.

According to the foregoing access solution, for a requirement that clustering communication is required, in an existing clustering communication solution, after mastering information about cluster member terminals, a cluster head terminal may randomly access a network device. Subsequently, the cluster head terminal may send an identity document (identity document, ID) of the cluster head terminal and IDs of the cluster member terminals to the network device, and the network device allocates a radio network temporary identifier (radio network temporary identifier, RNTI) to each terminal and performs radio resource control (radio resource control, RRC) configuration on the terminal based on the ID of the cluster head terminal and the IDs of the cluster member terminals.

However, an existing cluster member terminal usually cannot determine a coverage level of a cell in which the cluster head terminal is located. As a result, the network device cannot perform different RRC configuration based on different coverage levels.

To resolve the foregoing problem, embodiments of this application provide a communication method and apparatus, to resolve a problem in a conventional technology that a cluster member terminal cannot determine a coverage level of a cell in which a cluster head terminal is located. A technical concept of this application is as follows: A cluster head terminal sends indication information of a target reference signal to a cluster member terminal, so that the cluster member terminal measures the target reference signal, to obtain a coverage level of the cluster member terminal in a target cell. Therefore, the cluster member terminal can determine the coverage level of the cell in which the cluster head terminal is located, and further a network device can perform different RRC configuration based on different coverage levels.

The following describes application scenarios in this application.

Figure 5:
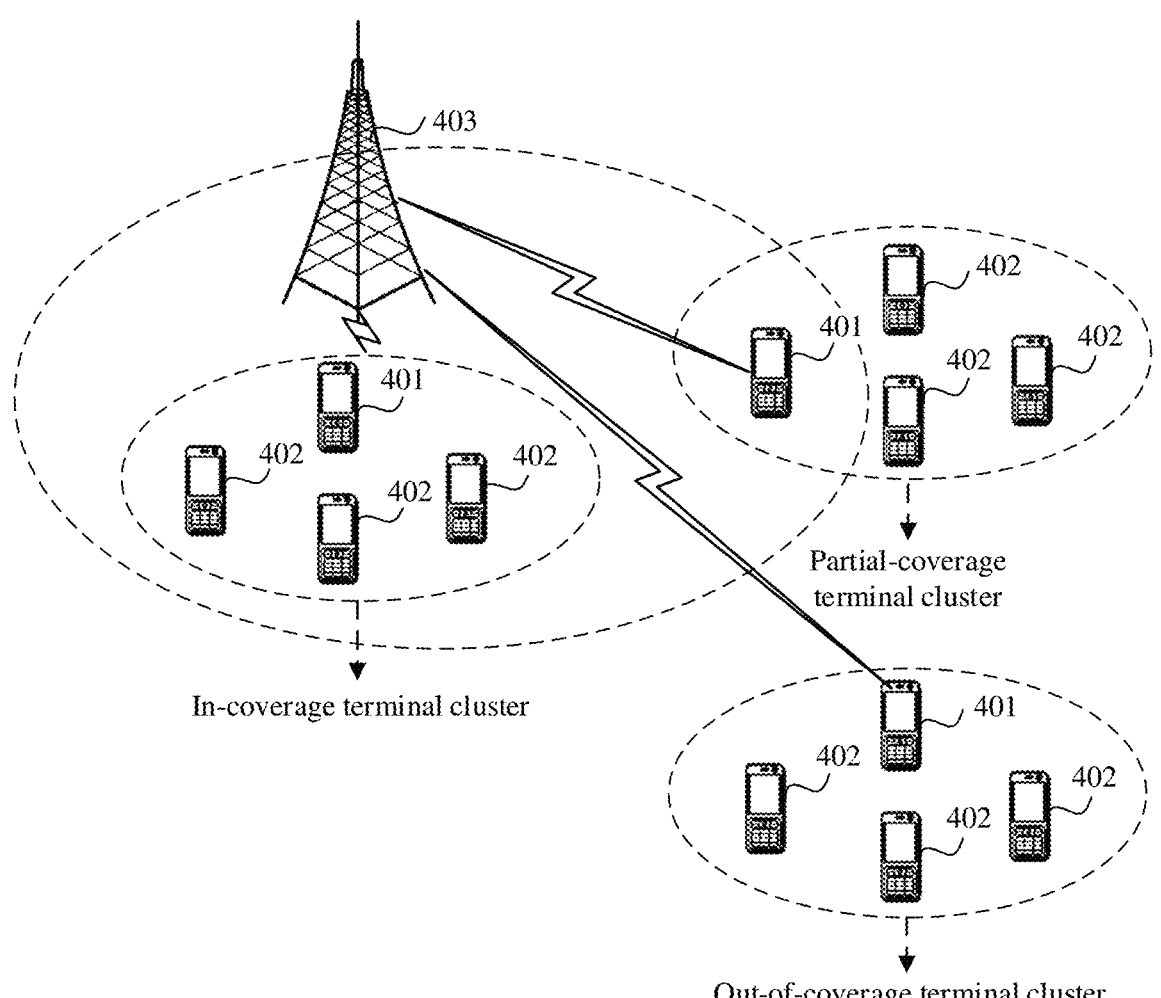
FIG. 5 is a schematic diagram of a clustering communication scenario according to an embodiment of this application.

FIG. 5 is a schematic diagram of a clustering communication scenario according to an embodiment of this application. As shown in FIG. 5, clustering communication usually includes a cluster head terminal 401 and a cluster member terminal 402. In a terminal cluster, a terminal with a high capability or sufficient battery power is usually used as the cluster head terminal 401. The cluster member terminal 402 forwards data to a network device 403 through the cluster head terminal 401. A terminal cluster may be in three coverage states, including in-coverage (In-Coverage), out-of-coverage (Out-of-Coverage), and partial-coverage (Partial-Coverage).

The cluster member terminal 402 and the cluster head terminal 401 each may be a mobile phone (mobile phone), a tablet computer (pad), a computer with a wireless transceiver function, a virtual reality (virtual reality, VR) terminal device, an augmented reality (augmented reality, AR) terminal device, a wireless terminal in industrial control (industrial control), a wireless terminal in self driving (self driving), a wireless terminal in remote surgery (remote surgery), a wireless terminal in a smart grid (smart grid), a wireless terminal in a smart home (smart home), or the like. The terminal device 401 provided in this embodiment of this application may support a mobile device in 5G new radio, for example, a mobile device such as a mobile phone or a pad. In embodiments of this application, an apparatus configured to implement a function of the terminal may be a terminal, or may be an apparatus, for example, a chip system, that can support the terminal in implementing this function. The apparatus may be installed in the terminal. In embodiments of this application, the chip system may include a chip; or may include a chip and another discrete component.

The network device 403 may be a base station, and may be a device that is deployed in a radio access network and that can perform wireless communication with a terminal. The base station may be in a plurality of forms, such as a macro base station, a micro base station, a relay station, and an access point. The base station may be configured to mutually convert a received over-the-air frame and an IP packet and serve as a router between the wireless terminal and a remaining portion of the access network, where the remaining portion of the access network may include an internet protocol (IP) network. The base station may further coordinate attribute management of an air interface. For example, the base station may be a base transceiver station (base transceiver station, BTS) in a global system for mobile communications (global system for mobile communications, GSM) or code division multiple access (code division multiple access, CDMA), or may be a NodeB (NodeB, NB) in wideband code division multiple access (wideband code division multiple access, WCDMA), or may be an evolved NodeB (evolved NodeB, eNB, or eNodeB) in long term evolution (long term evolution, LTE), a relay station, an access point, a 5G gNodeB, or the like. This is not limited herein. The network device 403 provided in this embodiment of this application may be specifically a 5G gNodeB, and mainly provides a radio access service, schedules a radio resource for an access terminal, and provides a reliable radio transmission protocol, a data encryption protocol, and the like.

The following uses a cluster member terminal, a cluster head terminal, and a network device as examples to describe in detail the technical solutions in embodiments of this application by using specific embodiments. The following several specific embodiments may be combined with each other, and a same or similar concept or process may not be described repeatedly in some embodiments.

Figure 6:
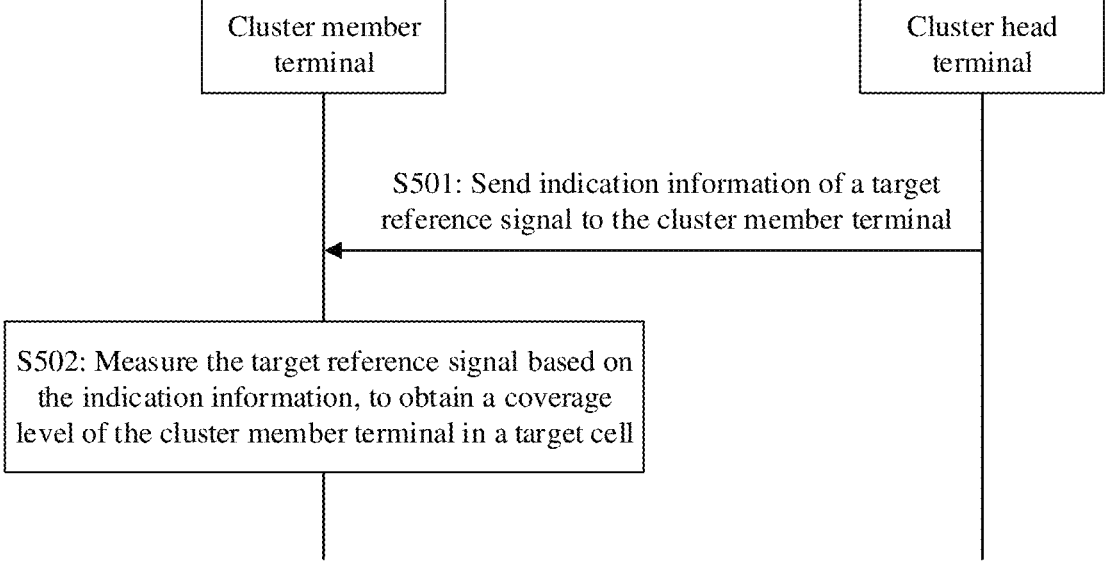
FIG. 6 is a signaling exchange diagram of a communication method according to an embodiment of this application.

FIG. 6 is a signaling exchange diagram of a communication method according to an embodiment of this application. This embodiment relates to a specific process of determining a coverage level of a cluster member terminal in a target cell in this embodiment. As shown in FIG. 6, the method includes the following steps.

S501: A cluster head terminal sends indication information of a target reference signal to a cluster member terminal.

The indication information of the target reference signal includes an identifier of the target reference signal, a time-frequency position of the target reference signal, and/or a synchronization sequence pattern of the target reference signal. The sequence pattern may be, for example, a PSS pattern or an SSS pattern. The target reference signal may be an SSB and/or a channel state information-reference signal (channel state information-reference signal, CSI-RS).

In some embodiments, if the cluster head terminal is in a non-connected state, after receiving information that is about a reference signal and that is broadcast by a network device, the cluster head terminal may perform cell searching in a manner defined in an existing protocol, including searching for the reference signal on a plurality of frequencies defined in the protocol. Subsequently, after finding the reference signal, the cluster head terminal may select a cell to camp on, obtain system information, and select a target reference signal. In this case, the cluster head terminal may send the selected target reference signal to the cluster member terminal.

In some embodiments, if the cluster head terminal is in a connected state, the cluster head terminal may directly send the target reference signal to the cluster member terminal.

How to determine the target reference signal is not limited in this embodiment of this application. In some embodiments, the target reference signal may be indicated by the network device. The cluster head terminal may receive first information sent by the network device, where the first information indicates the target reference signal from a plurality of reference signals. Then, the network device determines the target reference signal based on the first information. In some other embodiments, the target reference signal may be specified by the cluster head terminal, and the cluster head terminal may directly determine the target reference signal from a plurality of reference signals.

How the cluster head terminal sends the indication information of the target reference signal to the cluster member terminal is not limited in this embodiment of this application. In some embodiments, the indication information of the target reference information may be carried in a SIB 1, and the cluster head terminal may send the indication information of the target reference signal to the cluster member terminal in a broadcast manner.

S502: The cluster member terminal measures the target reference signal based on the indication information, to obtain a coverage level of the cluster member terminal in a target cell.

In this step, after receiving the indication information that is of the target reference signal and that is sent by the cluster head terminal, the cluster member terminal may measure the target reference signal based on the indication information, to obtain the coverage level of the cluster member terminal in the target cell.

The target cell is a cell on which the cluster head terminal camps.

In some embodiments, the cluster member terminal may determine the target reference signal based on the indication information of the target reference signal. Then, the cluster member terminal measures the target reference signal to obtain a reference signal received power RSRP corresponding to the target reference signal. Finally, the cluster member terminal obtains the coverage level of the cluster member terminal in the target cell based on the RSRP corresponding to the target reference signal and one or more RSRP thresholds.

For example, the coverage level may include a coverage level 1, a coverage level 2, and a coverage level 3. The coverage level 1 and the coverage level 2 may be located within coverage of the cell, and the coverage level 3 may be located outside the coverage of the cell. A signal strength at the coverage level 1 is higher than that at the coverage level 2, and the signal strength at the coverage level 2 is higher than that at the coverage level 3.

For example, if the cluster member terminal receives only a first RSRP threshold, the RSRP corresponding to the target reference signal may be compared with the first RSRP threshold. If the RSRP corresponding to the target reference signal is less than or equal to the first RSRP threshold, it is determined that the cluster member terminal is located outside coverage of the target cell. If the RSRP corresponding to the target reference signal is greater than or equal to the first RSRP threshold, it is determined that the cluster member terminal falls within the coverage of the target cell.

For example, if the cluster member terminal receives a first RSRP threshold and a second RSRP threshold, the RSRP corresponding to the target reference signal may be separately compared with the first RSRP threshold and the second RSRP threshold. If the RSRP corresponding to the target reference signal is less than or equal to the first RSRP threshold, it is determined that the cluster member terminal is at a third coverage level. In this case, the cluster member terminal is located outside the coverage of the target cell. If the RSRP corresponding to the target reference signal is greater than or equal to the second RSRP threshold, it is determined that the cluster member terminal is at a first coverage level. In this case, the cluster member terminal is within the coverage of the target cell, and a signal is strong. If the RSRP corresponding to the target reference signal is greater than the first RSRP threshold and less than the second RSRP threshold, it is determined that the cluster member terminal is at a second coverage level. In this case, the cluster member terminal is within the coverage of the target cell, but a signal is weak.

In some embodiments, if the cluster member already camps on a cell, the cluster member terminal may further send, to the cluster head terminal, an identifier of the cell on which the cluster member terminal camps and/or a connection status of the cluster member terminal in the cell on which the cluster member terminal camps.

According to the communication method provided in this embodiment of this application, the cluster member terminal receives the indication information that is of the target reference signal and that is sent by the cluster head terminal, and then the cluster member terminal measures the target reference signal based on the indication information, to obtain the coverage level of the cluster member terminal in the target cell. In comparison with a conventional technology, in this embodiment of this application, the cluster head terminal indicates, by sending the indication information of the target reference signal to the cluster member terminal, the cluster member terminal to measure the target reference signal, so that the cluster head terminal learns of the coverage level of the cluster member terminal in the target cell, and further, the network device can perform different RRC configuration based on different coverage levels of the cluster member terminal.

Figure 7:
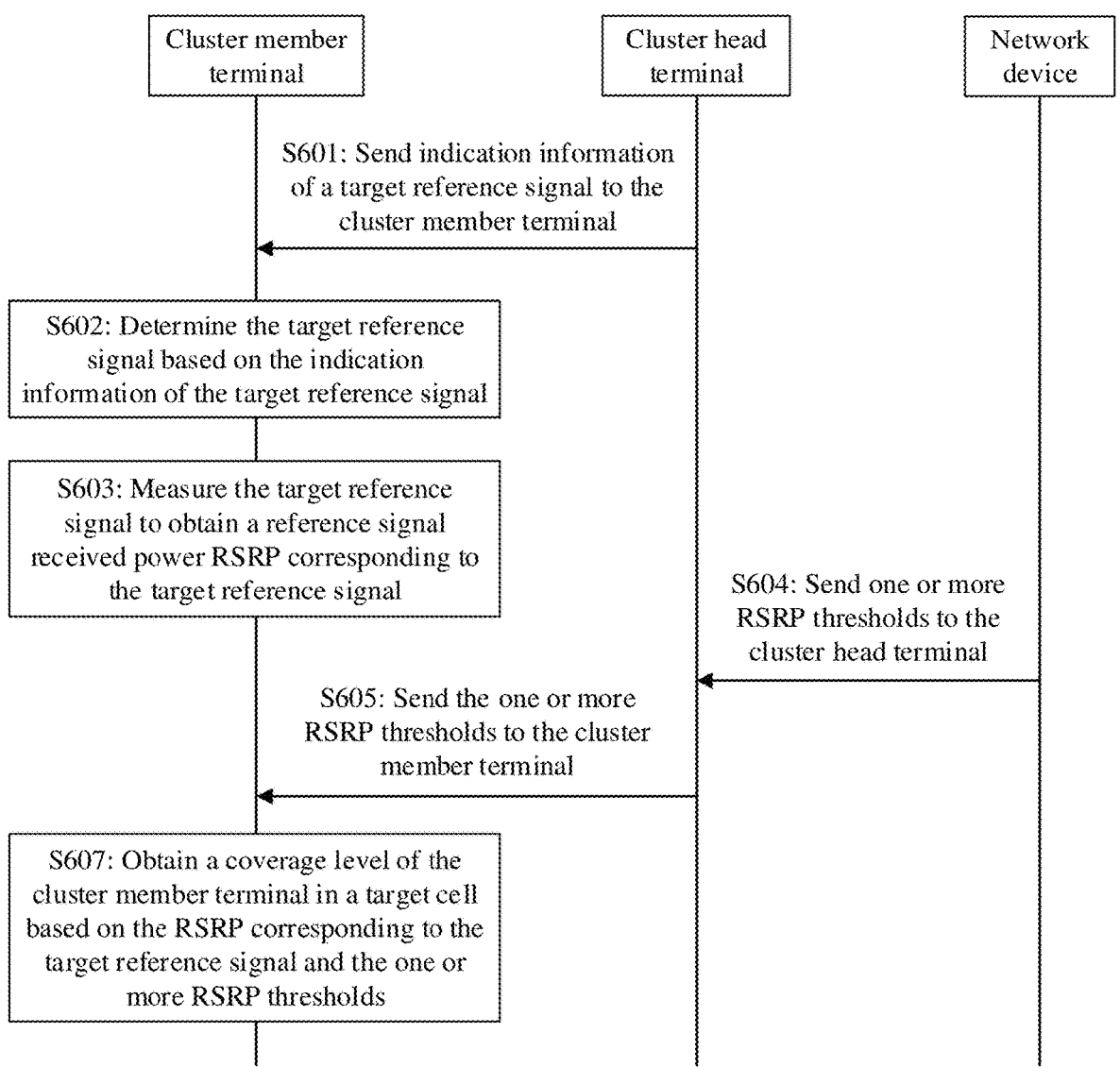
FIG. 7 is a signaling exchange diagram of another communication method according to an embodiment of this application.

Based on the foregoing embodiment, the following describes how to obtain a coverage level of a cluster member terminal in a target cell. FIG. 7 is a signaling exchange diagram of another communication method according to an embodiment of this application. As shown in FIG. 7, the method includes the following steps.

S601: A cluster head terminal sends indication information of a target reference signal to a cluster member terminal.

In this embodiment, a specific implementation process and implementation principle of step S601 are similar to those of step S501 in FIG. 6. Details are not described herein again.

S602: The cluster member terminal determines the target reference signal based on the indication information of the target reference signal.

The indication information of the target reference signal may include an identifier of the target reference signal, a time-frequency position of the target reference signal, and/or a synchronization sequence pattern of the target reference signal.

In some embodiments, the cluster member terminal may determine, based on the identifier of the target reference signal and/or the time-frequency position of the target reference signal, a cell on which the cluster head camps and the target reference signal.

S603: The cluster member terminal measures the target reference signal to obtain a reference signal received power RSRP corresponding to the target reference signal.

In this step, after determining the target reference signal, the cluster member terminal may measure the target reference signal to obtain the reference signal received power RSRP corresponding to the target reference signal.

How to perform RSRP measurement is not limited in this embodiment of this application, and an existing RSRP measurement manner may be used.

S604: A network device sends one or more RSRP thresholds to the cluster head terminal.

How the network device sends the RSRP threshold to the cluster head terminal is not limited in this embodiment of this application. In some embodiments, if the cluster head terminal and the network device are in a connected state, the network device may directly send the one or more RSRP thresholds to the cluster head terminal. In some other embodiments, if the cluster head terminal and the network device are in a non-connected state, the one or more RSRP thresholds may be carried in system information, and the network device may send the one or more RSRP thresholds to the cluster head terminal by broadcasting the system information.

It should be noted that a sequence of performing step S604 is not limited in this embodiment of this application, and step S604 only needs to be performed before step S605. In some embodiments, step S604 may be performed before step S601. In some other embodiments, step S604 may be performed after step S601.

S605: The cluster head terminal sends the one or more RSRP thresholds to the cluster member terminal.

For example, the cluster head terminal may send the one or more RSRP thresholds to the cluster member terminal in a broadcast manner.

S606: The cluster member terminal obtains the coverage level of the cluster member terminal in the target cell based on the RSRP corresponding to the target reference signal and the one or more RSRP thresholds.

The one or more RSRP thresholds may include a first RSRP threshold and a second RSRP threshold, and the first RSRP threshold is less than the second RSRP threshold.

For example, if the cluster member terminal receives only the first RSRP threshold, the RSRP corresponding to the target reference signal may be compared with the first RSRP threshold. If the RSRP corresponding to the target reference signal is less than or equal to the first RSRP threshold, it is determined that the cluster member terminal is located outside coverage of the target cell. If the RSRP corresponding to the target reference signal is greater than or equal to the first RSRP threshold, it is determined that the cluster member terminal falls within the coverage of the target cell.

For example, if the cluster member terminal receives a first RSRP threshold and a second RSRP threshold, the RSRP corresponding to the target reference signal may be separately compared with the first RSRP threshold and the second RSRP threshold. If the RSRP corresponding to the target reference signal is less than or equal to the first RSRP threshold, it is determined that the cluster member terminal is at a third coverage level. In this case, the cluster member terminal is located outside the coverage of the target cell. If the RSRP corresponding to the target reference signal is greater than or equal to the second RSRP threshold, it is determined that the cluster member terminal is at a first coverage level. In this case, the cluster member terminal is within the coverage of the target cell, and a signal is strong. If the RSRP corresponding to the target reference signal is greater than the first RSRP threshold and less than the second RSRP threshold, it is determined that the cluster member terminal is at a second coverage level. In this case, the cluster member terminal is within the coverage of the target cell, but a signal is weak.

According to the communication method provided in this embodiment of this application, the cluster member terminal first determines the target reference signal based on the indication information of the target reference signal. Then, the cluster member terminal measures the target reference signal to obtain the reference signal received power RSRP corresponding to the target reference signal. Finally, the cluster member terminal obtains the coverage level of the cluster member terminal in the target cell based on the RSRP corresponding to the target reference signal and the one or more RSRP thresholds. In comparison with a conventional technology, in this embodiment of this application, the cluster member terminal measures the target reference signal based on the indication information of the target reference signal, so that the cluster head terminal learns of the coverage level of the cluster member terminal in the target cell, and further, the network device can perform different RRC configuration based on different coverage levels of the cluster member terminal.

Figure 8:
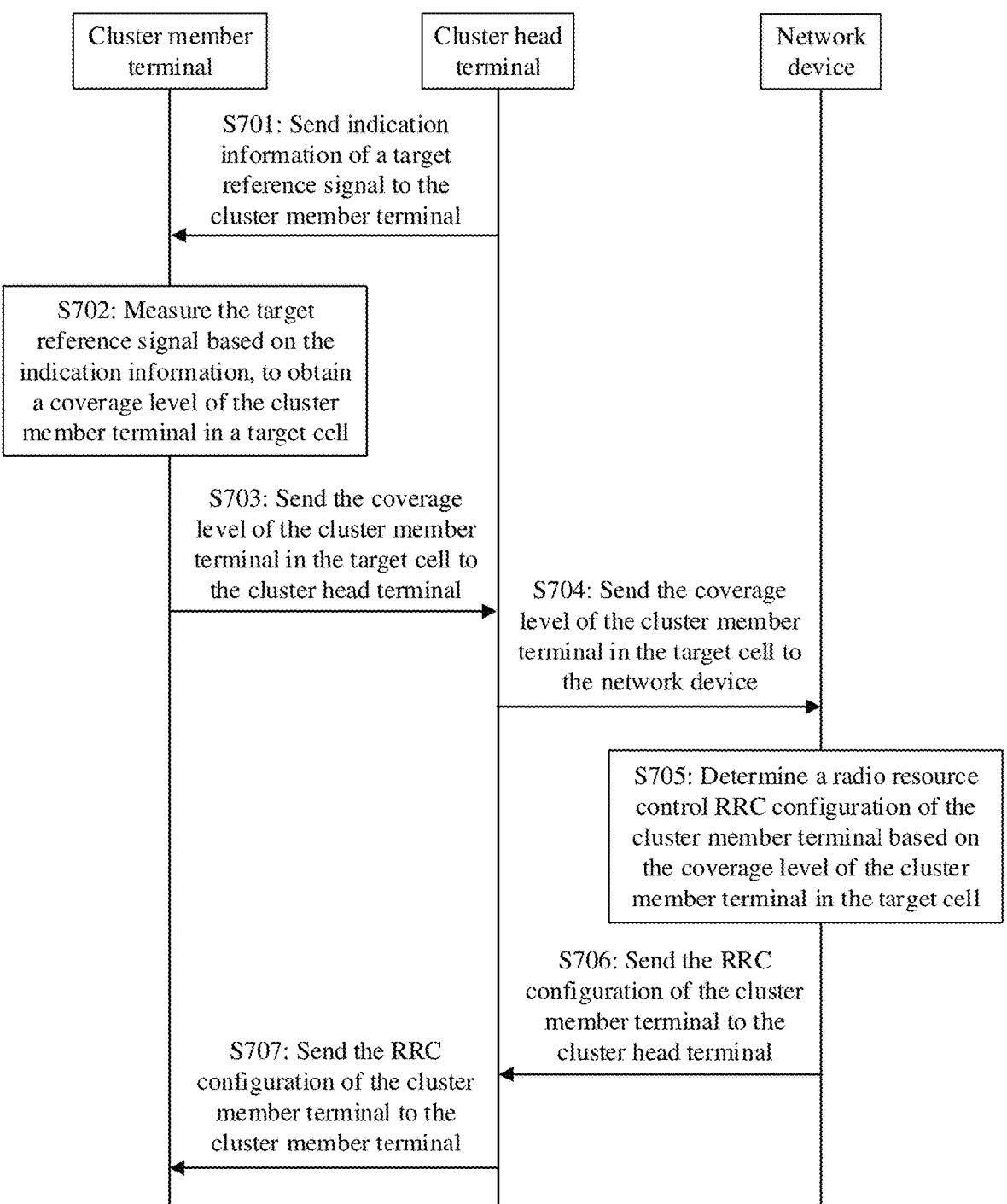
FIG. 8 is a signaling exchange diagram of still another communication method according to an embodiment of this application.

Based on the foregoing embodiment, the following specifically describes how a network device performs RRC configuration based on a coverage level of a cluster member terminal. FIG. 8 is a signaling exchange diagram of still another communication method according to an embodiment of this application. As shown in FIG. 8, the method includes the following steps.

S701: A cluster head terminal sends indication information of a target reference signal to a cluster member terminal.

S702: The cluster member terminal measures the target reference signal based on the indication information, to obtain a coverage level of the cluster member terminal in a target cell.

In this embodiment, a specific implementation process and implementation principle of step S701 and S702 are similar to those of step S501 and S502 in FIG. 6. Details are not described herein again.

S703: The cluster member terminal sends the coverage level of the cluster member terminal in the target cell to the cluster head terminal.

In this step, after determining the coverage level of the cluster member terminal in the target cell, the cluster member terminal may send the coverage level of the cluster member terminal in the target cell to the cluster head terminal.

In some embodiments, the cluster member terminal may camp on another cell that is not the target cell. For example, if the cluster member terminal already camps on a cell and is in a connected state in the cell, the cluster member terminal may send, to the cluster head terminal, an identifier of the cell on which the cluster member terminal camps and/or a connection status of the cluster member terminal in the cell on which the cluster member terminal camps.

S704: The cluster head terminal sends the coverage level of the cluster member terminal in the target cell to a network device.

In this step, after receiving the coverage level of the cluster member terminal in the target cell, the cluster head terminal may send the coverage level of the cluster member terminal in the target cell to the network device. In some embodiments, the cluster head terminal may further report, to the network device, an identifier of a cell on which a to-be-accessed cluster member terminal camps and/or a connection status of the cluster member terminal in the cell on which the to-be-accessed cluster member terminal camps.

How to send the coverage level of the cluster member terminal in the target cell to the network device is not limited in this embodiment of this application. In some embodiments, if the cluster head terminal is in a connected state in the target cell, the cluster head terminal may directly report an identifier of a to-be-accessed cluster member and a corresponding coverage level to a network side. In some other embodiments, if the cluster head terminal is in a non-connected state in the target cell, the cluster head terminal sends the coverage level of the cluster member terminal in the target cell to the network device by using a random access request initiated by the cluster head terminal. For example, the cluster head terminal may initiate a random access request. For example, the cluster head terminal may report an identifier of each cluster member and a corresponding coverage level by using a Msg3 in four-step random access or a MsgA in two-step random access.

In some embodiments, if the cluster member terminal already camps on a first cell other than the target cell, after obtaining the coverage level of the cluster member terminal and that the cluster member terminal is in a connected state in the first cell, the network device may request to obtain a context of the cluster member terminal from the first cell, so that when the cluster member terminal is in the connected state in the first cell, the cluster member terminal can communicate with the first cell, and further communicate with the target cell as a cluster member manner in the target cell.

S705: The network device determines a radio resource control RRC configuration of the cluster member terminal based on the coverage level of the cluster member terminal in the target cell.

In this step, after receiving the coverage level of the cluster member terminal in the target cell, the network device may determine the radio resource control RRC configuration of the cluster member terminal based on the coverage level of the cluster member terminal in the target cell.

In some embodiments, if the cluster head terminal is in the non-connected state in the target cell, the network device configures an RRC resource for the cluster head and the cluster member by using a Msg4 in four-step random access or a MsgB in two-step random access, and configures different RRC resources for terminals at different coverage levels.

In some other embodiments, if the cluster head terminal is in the connected state in the target cell, the network device may allocate a radio network temporary identifier (radio network temporary identity, RNTI) to each cluster member, and then configure an RRC resource for a to-be-accessed cluster member based on a coverage level of the cluster member terminal and a connection status of the cluster member terminal in a cell on which the cluster member camps.

A type of the RRC resource is not limited in this embodiment of this application. For example, different search spaces may be configured.

S706: The network device sends the RRC configuration of the cluster member terminal to the cluster head terminal.

S707: The cluster head terminal sends the RRC configuration of the cluster member terminal to the cluster member terminal.

According to the communication method provided in this embodiment of this application, the cluster head terminal sends the indication information of the target reference signal to the cluster member terminal. The cluster member terminal measures the target reference signal based on the indication information, to obtain the coverage level of the cluster member terminal in the target cell. The cluster member terminal sends the coverage level of the cluster member terminal in the target cell to the cluster head terminal. Subsequently, the cluster member terminal sends the coverage level of the cluster member terminal in the target cell to the cluster head terminal, so that the cluster head terminal sends the coverage level of the cluster member terminal in the target cell to the network device. Therefore, the network device determines the radio resource control RRC configuration of the cluster member terminal based on the coverage level of the cluster member terminal in the target cell. In this manner, the network device can configure RRC information for each terminal in a cluster based on a coverage level of the cluster member.

Persons of ordinary skill in the art may understand that all or some of the steps of the method embodiments may be implemented by program information related hardware. The program may be stored in a computer-readable storage medium. When the program is executed, the steps of the method embodiments are performed. The foregoing storage medium includes various media that can store program code, such as a ROM, a RAM, a magnetic disk, or an optical disc.

Figure 9:
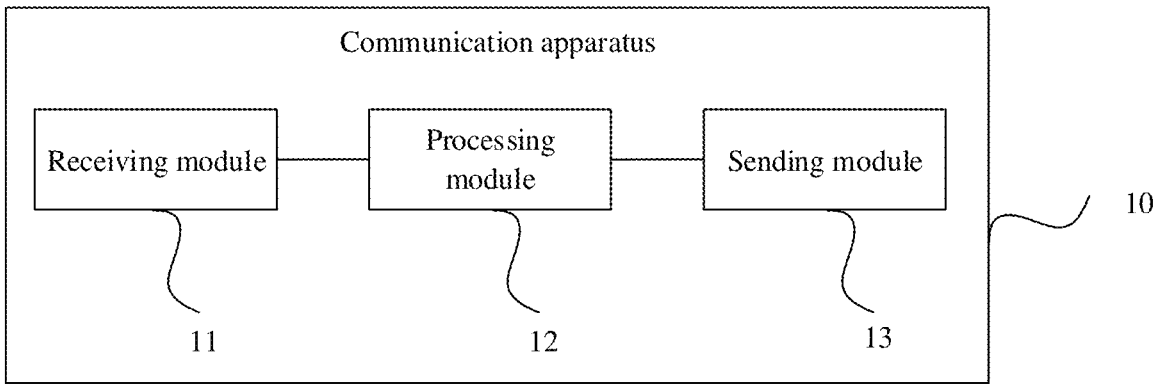
FIG. 9 is a schematic diagram of a structure of a communication apparatus according to an embodiment of this application.

FIG. 9 is a schematic diagram of a structure of a communication apparatus according to an embodiment of this application. The communication apparatus may be implemented by using software, hardware, or a combination thereof, and may be the cluster member terminal or a chip of the cluster member terminal, to perform the communication method on the cluster member terminal side. As shown in FIG. 9, the communication apparatus 10 includes a receiving module 11, a processing module 12, and a sending module 13.

The receiving module 11 is configured to receive indication information that is of a target reference signal and that is sent by a cluster head terminal.

The processing module 12 is configured to measure the target reference signal based on the indication information, to obtain a coverage level of the cluster member terminal in a target cell.

In an optional implementation, the apparatus further includes:

the sending module 13 is configured to send the coverage level of the cluster member terminal in the target cell to the cluster head terminal.

In an optional implementation, the indication information of the target reference signal includes an identifier of the target reference signal, a time-frequency position of the target reference signal, and/or a synchronization sequence pattern of the target reference signal.

In an optional implementation, the processing module 12 is specifically configured to: determine the target reference signal based on the indication information of the target reference signal; measure the target reference signal to obtain a reference signal received power RSRP corresponding to the target reference signal; and obtain the coverage level of the cluster member terminal in the target cell based on the RSRP corresponding to the target reference signal and one or more RSRP thresholds.

In an optional implementation, the receiving module 11 is further configured to receive the one or more RSRP thresholds sent by the cluster head terminal.

In an optional implementation, the sending module 13 is further configured to send, to the cluster head terminal, an identifier of a cell on which the cluster member terminal camps and/or a connection status of the cluster member terminal in the cell on which the cluster member terminal camps.

In an optional implementation, the receiving module 11 is further configured to receive a radio resource control RRC configuration that is of the cluster member terminal and that is sent by the cluster head terminal.

In an implementation, the target reference signal includes a synchronization signal block SSB and/or a channel state information-reference signal CSI-RS.

The communication apparatus provided in this embodiment of this application may perform an action of the communication method on the cluster member terminal side in the foregoing method embodiments. Implementation principles and technical effects of the communication apparatus are similar to those in the method embodiments, and details are not described herein again.

Figure 10:
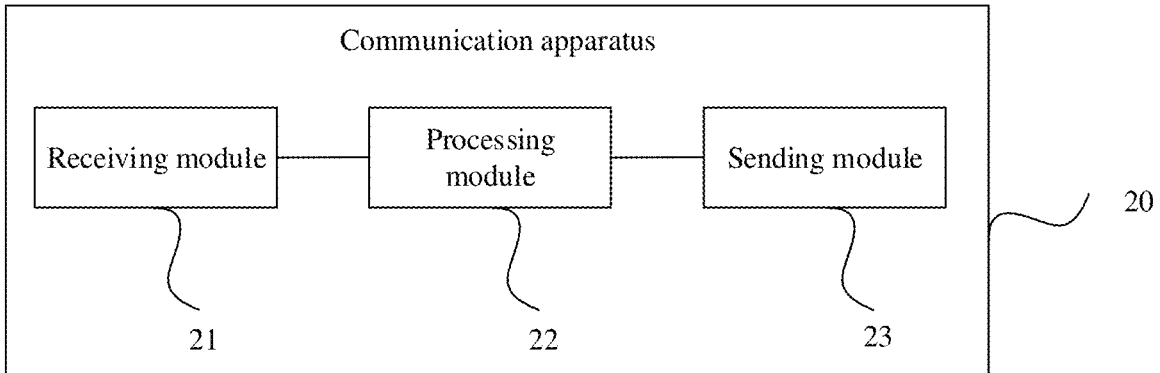
FIG. 10 is a schematic diagram of a structure of another communication apparatus according to an embodiment of this application.

FIG. 10 is a schematic diagram of a structure of another communication apparatus according to an embodiment of this application. The communication apparatus may be implemented by using software, hardware, or a combination thereof, and may be the cluster head terminal or a chip of the cluster head terminal, to perform the communication method on the cluster head terminal side. As shown in FIG. 10, the communication apparatus 20 includes a receiving module 21, a processing module 22, and a sending module 23.

The sending module 23 is configured to send indication information of a target reference signal to a cluster member terminal.

The receiving module 21 is configured to receive a coverage level that is of the cluster member terminal in a target cell and that is sent by the cluster member terminal.

In an optional implementation, the sending module is further configured to send the coverage level of the cluster member terminal in the target cell to a network device.

In an optional implementation, the indication information of the target reference signal includes an identifier of the target reference signal, a time-frequency position of the target reference signal, and/or a synchronization sequence pattern of the target reference signal.

In an optional implementation, the receiving module 21 is further configured to receive an RSRP threshold sent by the network device; and the sending module 23 is further configured to send the RSRP threshold to the cluster member terminal.

In an optional implementation, the apparatus further includes:

the processing module 22 is configured to determine the target reference signal from a plurality of reference signals.

In an optional implementation, the receiving module 21 is further configured to receive first information sent by the network device, where the first information indicates the target reference signal from the plurality of reference signals.

In an optional implementation, the sending module 23 is specifically configured to send the coverage level of the cluster member terminal in the target cell to the network device by using a random access request initiated by the cluster head terminal.

In an optional implementation, the receiving module is further configured to receive, from the cluster member terminal, an identifier of a cell on which the cluster member terminal camps and/or a connection status of the cluster member terminal in the cell on which the cluster member terminal camps.

In an implementation, the target reference signal includes a synchronization signal block SSB and/or a channel state information-reference signal CSI-RS.

The communication apparatus provided in this embodiment of this application may perform an action of the communication method on the cluster head terminal side in the foregoing method embodiments. Implementation principles and technical effects of the communication apparatus are similar to those in the method embodiments, and details are not described herein again.

Figure 11:
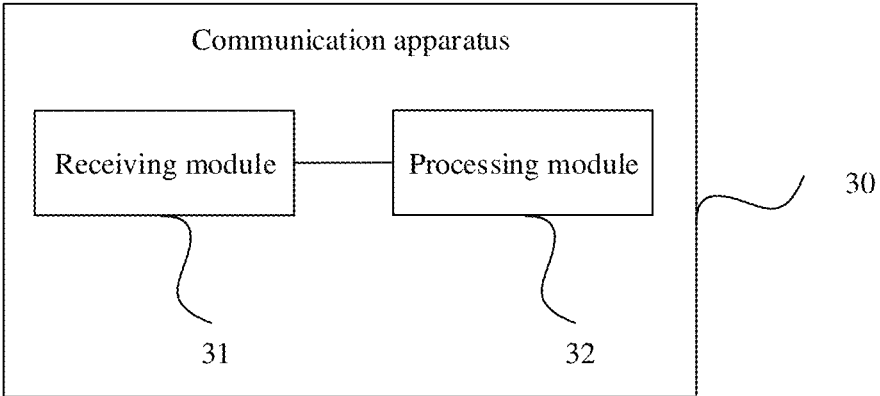
FIG. 11 is a schematic diagram of a structure of still another communication apparatus according to an embodiment of this application.

FIG. 11 is a schematic diagram of a structure of still another communication apparatus according to an embodiment of this application. The communication apparatus may be implemented by using software, hardware, or a combination thereof, and may be the foregoing network device or a chip of the network device, to perform the foregoing communication method on the network device side. As shown in FIG. 11, the communication apparatus 30 includes a receiving module 31 and a processing module 32.

The receiving module 31 is configured to receive a coverage level that is of a cluster member terminal in a target cell and that is sent by a cluster head terminal.

The processing module 32 is configured to determine a radio resource control RRC configuration of the cluster member terminal based on the coverage level of the cluster member terminal in the target cell.

Figure 12:
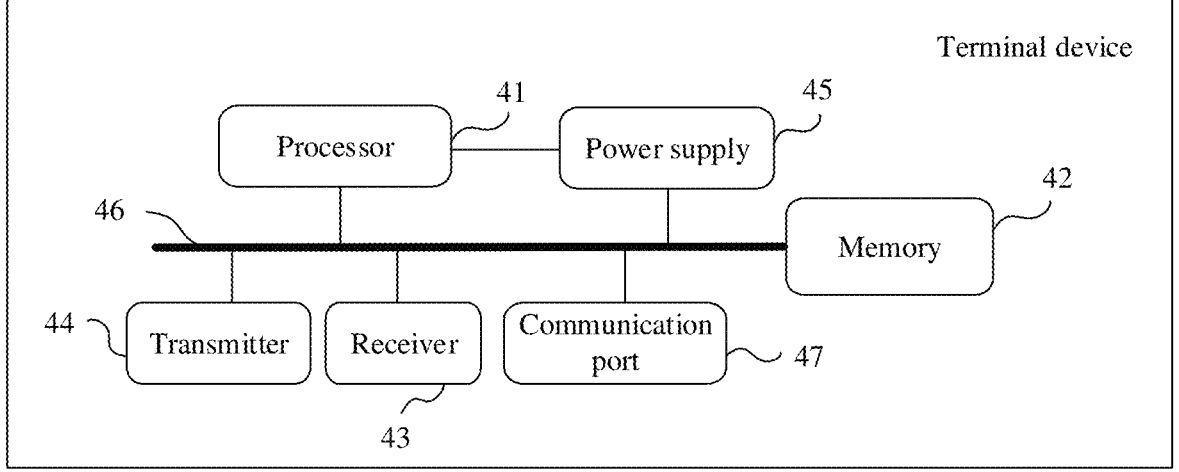
FIG. 12 is a schematic diagram of a structure of a terminal device according to an embodiment of this application.

FIG. 12 is a schematic diagram of a structure of a terminal device according to an embodiment of this application. As shown in FIG. 12, the terminal device may include a processor 41 (for example, a CPU), a memory 42, a receiver 43, and a transmitter 44. Both the receiver 43 and the transmitter 44 are coupled to the processor 41. The processor 41 controls a receiving action of the receiver 43, and the processor 41 controls a sending action of the transmitter 44 The memory 42 may include a high-speed RAM memory, and may further include a non-volatile memory NVM, for example, at least one magnetic disk memory. The memory 42 may store various types of information, to complete various processing functions and implement the method steps in embodiments of this application. Optionally, the terminal device in this embodiment of this application may further include a power supply 45, a communication bus 46, and a communication port 47. The receiver 43 and the transmitter 44 may be integrated into a transceiver of the terminal device, or may be an independent transceiver antenna on the terminal device. The communication bus 46 is configured to implement communication connection between elements. The communication port 47 is configured to implement connection communication between the terminal device and another peripheral.

In this embodiment of this application, the memory 42 is configured to store computer-executable program code, and the program code includes information. When the processor 41 executes the information, the information enables the processor 41 to perform a processing action of the cluster member terminal or the cluster head terminal in the foregoing method embodiment, enables the transmitter 44 to perform a sending action of the cluster member terminal or the cluster head terminal in the foregoing method embodiment, and enables the receiver 43 to perform a receiving action of the cluster member terminal or the cluster head terminal in the foregoing method embodiment. Implementation principles and technical effects of the terminal device are similar to those in the method embodiment, and details are not described herein again.

Figure 13:
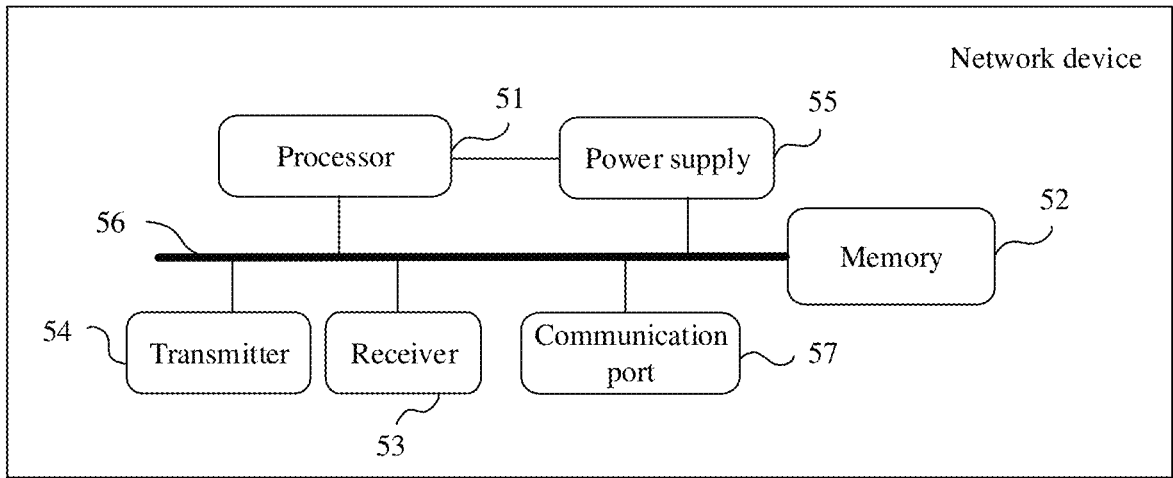
FIG. 13 is a schematic diagram of a structure of a network device according to an embodiment of this application.

FIG. 13 is a schematic diagram of a structure of a network device according to an embodiment of this application. As shown in FIG. 13, the network device may include a processor 51 (for example, a CPU), a memory 52, a receiver 53, and a transmitter 55. The receiver 53 and the transmitter 55 are coupled to the processor 51, and the processor 51 controls a receiving action of the receiver 53 and a sending action of the transmitter 55. The memory 52 may include a high-speed RAM memory, and may further include a non-volatile memory NVM, for example, at least one magnetic disk memory. The memory 52 may store various types of information, to complete various processing functions and implement the method steps in embodiments of this application. Optionally, the network device in this embodiment of this application may further include a power supply 55, a communication bus 56, and a communication port 57. The receiver 53 and the transmitter 55 may be integrated into a transceiver of the network device, or may be an independent transceiver antenna on the network device. The communication bus 56 is configured to implement communication connection between elements. The communication port 57 is configured to implement connection communication between the network device and another peripheral.

In this embodiment of this application, the memory 52 is configured to store computer-executable program code, and the program code includes information. When the processor 51 executes the information, the information enables the processor 51 to perform a processing action of the network device in the foregoing method embodiment, enables the transmitter 55 to perform a sending action of the network device in the foregoing method embodiment, and enables the receiver 53 to perform a receiving action of the network device in the foregoing method embodiment. Implementation principles and technical effects of the network device are similar to those in the method embodiment, and details are not described herein again.

An embodiment of this application further provides a chip, including a processor and an interface. The interface is configured to input/output data or instructions processed by the processor. The processor is configured to perform the method provided in the foregoing method embodiment. The chip may be applied to a cluster member terminal or a cluster head terminal, or may be applied to a network device.

The present invention further provides a computer-readable storage medium. The computer-readable storage medium may include: any medium that can store program code, such as a USB flash drive, a removable hard disk, a read-only memory (ROM, Read-Only Memory), a random access memory (RAM, Random Access Memory), a magnetic disk, or an optical disc. Specifically, the computer-readable storage medium stores program information, where the program information is used in the foregoing communication method on the cluster member terminal side, used in the foregoing communication method on the cluster head terminal side, or used in the foregoing communication method on the network device side.

An embodiment of this application further provides a program. When being executed by a processor, the program is configured to perform the communication method on the cluster member terminal side, the communication method on the network device side, or the communication method on the network device side provided in the foregoing method embodiment.

An embodiment of this application further provides a program product, for example, a computer-readable storage medium. The program product stores instructions. When the instructions are run on a computer, the computer is enabled to perform the communication method on the cluster head terminal side or the communication method on the network device side provided in the foregoing method embodiment.

All or some of the foregoing embodiments may be implemented by using software, hardware, firmware, or any combination thereof. When software is used to implement the embodiments, all or a part of the embodiments may be implemented in a form of a computer program product. The computer program product includes one or more computer instructions. When the computer program instructions are loaded and executed on a computer, all or a part of the procedures or functions according to embodiments of the present invention are generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid-State Drive (SSD)), or the like.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of embodiments of the present invention.

What is claimed is:

1. A communication method, comprising:
   receiving indication information of a target reference signal from a cluster head terminal;
   receiving one or more reference signal received power (RSRP) thresholds from the cluster head terminal;
   measuring the target reference signal to obtain an RSRP corresponding to the target reference signal; and
   obtaining a coverage level of a cluster member terminal in a target cell based on the one or more RSRP thresholds and the RSRP corresponding to the target reference signal.

2. The communication method according to claim 1, wherein after the obtaining the coverage level of the cluster member terminal in the target cell, the method further comprises:
   sending the coverage level of the cluster member terminal in the target cell to the cluster head terminal.

3. The communication method according to claim 2, wherein after the sending the coverage level of the cluster member terminal in the target cell to the cluster head terminal, the method further comprises:
   sending, to the cluster head terminal, at least one of an identifier of a cell on which the cluster member terminal camps or a connection status of the cluster member terminal in the cell on which the cluster member terminal camps.

4. The communication method according to claim 2, wherein after the sending the coverage level of the cluster member terminal in the target cell to the cluster head terminal, the method further comprises:
   receiving a radio resource control (RRC) configuration of the cluster member terminal from the cluster head terminal.

5. The communication method according to claim 1, wherein the indication information of the target reference signal comprises at least one of an identifier of the target reference signal, a time-frequency position of the target reference signal, or a synchronization sequence pattern of the target reference signal.

6. The communication method according to claim 1, further comprising:
   determining the target reference signal based on the indication information of the target reference signal.

7. The communication method according to claim 1, wherein the one or more RSRP thresholds are received from the cluster head terminal before the obtaining the coverage level of the cluster member terminal in the target cell.

8. The communication method according to claim 1, wherein the target reference signal comprises at least one of a synchronization signal block (SSB) or a channel state information-reference signal (CSI-RS).

9. A communication method, comprising:

determining a target reference signal from a plurality of reference signals;

sending indication information of the target reference signal to a cluster member terminal to cause the cluster member terminal to measure the target reference signal based on the indication information and obtain a coverage level of a cluster member terminal in a target cell; and receiving the coverage level of the cluster member terminal in the target cell from the cluster member terminal.

10. The communication method according to claim 9, wherein after the receiving the coverage level of the cluster member terminal in the target cell from the cluster member terminal, the method further comprises:

sending the coverage level of the cluster member terminal in the target cell to a network device.

11. The communication method according to claim 10, wherein the sending the coverage level of the cluster member terminal in the target cell to the network device comprises:

sending the coverage level of the cluster member terminal in the target cell to the network device by using a random access request initiated by a cluster head terminal.

12. The communication method according to claim 9, wherein the indication information of the target reference signal comprises at least one of an identifier of the target reference signal, a time-frequency position of the target reference signal, or a synchronization sequence pattern of the target reference signal.

13. The communication method according to claim 9, wherein before the receiving the coverage level of the cluster member terminal in the target cell from the cluster member terminal, the method further comprises:

receiving an (RSRP) threshold from a network device; and sending the RSRP threshold to the cluster member terminal.

14. The communication method according to claim 9, wherein the target reference signal is determined from the plurality of reference signals before sending the indication information of the target reference signal to the cluster member terminal.

15. The communication method according to claim 9, wherein before the sending the indication information of the target reference signal to the cluster member terminal, the method further comprises:

receiving first information from a network device, wherein the first information indicates the target reference signal from the plurality of reference signals.

16. The communication method according to claim 9, wherein after the receiving the coverage level of the cluster member terminal in the target cell from the cluster member terminal, the method further comprises:

receiving, from the cluster member terminal, at least one of an identifier of a cell on which the cluster member terminal camps or a connection status of the cluster member terminal in the cell on which the cluster member terminal camps.

17. The communication method according to claim 9, wherein the target reference signal comprises at least one of a synchronization signal block (SSB) or a channel state information-reference signal (CSI-RS).

18. A communication apparatus, comprising:

a transceiver;

a processor; and a non-transitory computer-readable storage medium having instructions stored thereon that, when executed by the processor, cause the communication apparatus to:

receive indication information of a target reference signal from a cluster head terminal;

receive one or more reference signal received power (RSRP) thresholds from the cluster head terminal;

measure the target reference signal to obtain an RSRP corresponding to the target reference signal; and obtain a coverage level of a cluster member terminal in a target cell based on the one or more RSRP thresholds and the RSRP corresponding to the target reference signal.

19. The communication apparatus according to claim 18, wherein the communication apparatus is further caused to:

send the coverage level of the cluster member terminal in the target cell to the cluster head terminal.

20. The communication apparatus according to claim 18, wherein the indication information of the target reference signal comprises at least one of an identifier of the target reference signal, a time-frequency position of the target reference signal, or a synchronization sequence pattern of the target reference signal.

* * * * *